US008587456B2

(12) United States Patent
Walter et al.

(10) Patent No.: US 8,587,456 B2
(45) Date of Patent: Nov. 19, 2013

(54) METHOD FOR DISTINGUISHING BETWEEN REFLECTORS ARRANGED ON THE ROADSIDE AND VEHICLE LIGHTS IN THE DARK

(75) Inventors: Michael Walter, Heerbrugg (CH); Thomas Fechner, Wasserburg (DE)

(73) Assignee: ADC Automotive Distance Control Systems GmbH, Lindau (DE)

( * ) Notice: Subject to any disclaimer, the term of this patent is extended or adjusted under 35 U.S.C. 154(b) by 222 days.

(21) Appl. No.: 12/739,760

(22) PCT Filed: Oct. 15, 2008

(86) PCT No.: PCT/DE2008/001687
§ 371 (c)(1),
(2), (4) Date: Aug. 3, 2010

(87) PCT Pub. No.: WO2009/052788
PCT Pub. Date: Apr. 30, 2009

(65) Prior Publication Data
US 2010/0295705 A1    Nov. 25, 2010

(30) Foreign Application Priority Data
Oct. 25, 2007 (DE) .......................... 10 2007 051 386

(51) Int. Cl.
*G08G 1/017* (2006.01)
(52) U.S. Cl.
USPC ............................ 340/937; 340/933; 382/104
(58) Field of Classification Search
None
See application file for complete search history.

(56) References Cited

U.S. PATENT DOCUMENTS

| 5,537,003 A * | 7/1996 | Bechtel et al. ................. 315/82 |
| 6,396,397 B1 * | 5/2002 | Bos et al. ....................... 340/461 |
| 7,724,962 B2 * | 5/2010 | Zhu et al. ....................... 382/225 |
| 7,972,045 B2 * | 7/2011 | Schofield ....................... 362/466 |
| 2003/0123706 A1 * | 7/2003 | Stam et al. .................... 382/104 |
| 2004/0069931 A1 | 4/2004 | Stam et al. |

(Continued)

FOREIGN PATENT DOCUMENTS

| EP | 1 837 803 | 9/2007 |
| WO | WO2004/034183 | 4/2004 |

OTHER PUBLICATIONS

International Search Report for PCT/DE2008/001687 dated Mar. 9, 2009.

*Primary Examiner* — Benjamin C Lee
*Assistant Examiner* — Rajsheed Black-Childress
(74) *Attorney, Agent, or Firm* — RatnerPrestia

(57) ABSTRACT

A method and a device for distinguishing between reflectors arranged on the roadside and vehicle lights and for identifying said reflectors and vehicle lights for use in an automatic light control system in a vehicle with a camera sensor oriented towards the surroundings of the vehicle. The method includes recording a sequence of images of the surroundings of the vehicle. Light spots are found and subjected to temporal tracking within the sequence of images. Afterwards, for each light spot, a decision is made whether the light source of the light spot is a vehicle light or a reflector. A statistical map for the entire camera image is determined from the position of the light spots found with the statistical map comprising regions that are predominantly occupied by reflectors and regions that are predominantly occupied by vehicles driving ahead or by oncoming vehicles. All light sources that are found within the regions occupied by reflectors are identified as potential reflectors and all light sources within the regions occupied by vehicle lights are identified as potential vehicle lights.

12 Claims, 1 Drawing Sheet

(56) References Cited

U.S. PATENT DOCUMENTS

| | | | |
|---|---|---|---|
| 2004/0143380 A1* | 7/2004 | Stam et al. | ............ 701/36 |
| 2006/0106518 A1 | 5/2006 | Stam et al. | |
| 2009/0010494 A1* | 1/2009 | Bechtel et al. | ............ 382/104 |
| 2009/0296415 A1* | 12/2009 | Heinrich et al. | ............ 362/465 |
| 2010/0026806 A1* | 2/2010 | Heinrich et al. | ............ 348/148 |
| 2010/0061594 A1* | 3/2010 | Heinrich et al. | ............ 382/103 |

* cited by examiner

METHOD FOR DISTINGUISHING BETWEEN REFLECTORS ARRANGED ON THE ROADSIDE AND VEHICLE LIGHTS IN THE DARK

CROSS-REFERENCE TO RELATED APPLICATIONS

This application is the U.S. national phase application of PCT International Application No. PCT/DE2008/001687, filed Oct. 15, 2008, which claims priority to German Patent Application No. DE 10 2007 051 386.2, filed Oct. 25, 2007, the contents of such application being incorporated herein by reference.

FIELD OF THE INVENTION

The invention relates to a method for distinguishing between reflectors arranged on the roadside and vehicle lights for use in motor vehicles.

BACKGROUND OF THE INVENTION

Document WO 2004/034183 A2, which is incorporated herein by reference, discloses a method for automatic light control for a motor vehicle with a camera sensor oriented towards the surroundings of the vehicle, said method providing at least a category for primary light sources in motion, in particular vehicle lights, wherein a sequence of images of the surroundings of the vehicle is recorded, at least one light spot is tracked in the sequence of images and the intensity of a tracked light spot is determined in at least two images, the measured intensity is analyzed, the lights of other vehicles are identified from the intensity values, and headlights are controlled in such a manner that drivers of other vehicles are not dazzled. Also an analysis of the motion of a light spot is proposed as a basis for categorization.

It has turned out that there are reflectors that can generate similar intensities as vehicle lights in the camera image. This may result in false decisions that considerably affect the safe or at least the convenient operation of an automatic light control system. Even if the motion of light spots is taken into consideration, false classifications cannot be completely precluded.

SUMMARY OF THE INVENTION

An object of the present invention is a method that provides increased reliability of distinguishing between reflectors and vehicle lights.

One of the objects of the present invention is achieved by a method wherein a sequence of images of the surroundings of the vehicle is recorded, light spots are found and subjected to temporal tracking within the sequence of images, afterwards, for each light spot, a decision is made whether the light source of the light spot is a vehicle light (FL1, FL2) or a reflector (R), a statistical map for the entire camera image is determined from the position of the light spots found, said statistical map comprising regions that are predominantly occupied by reflectors (R) and regions that are predominantly occupied by vehicles driving ahead (FL2) or by oncoming vehicles (FL1), and all light sources that are found within the regions occupied by reflectors (R) are identified as potential reflectors (R), all light sources within the regions occupied by vehicle lights (FL1, FL2) are identified as potential vehicle lights (FL1, FL2).

The present invention relates to making use of the fact that reflectors are arranged on the roadside and the lights of oncoming vehicles or those of vehicles driving ahead are arranged, in the vast majority of cases, on the roadway. Because of that it is possible to determine camera image regions in which reflectors are more likely to be found and to determine camera image regions in which vehicle lights are more likely to be found. This knowledge is made use of for distinguishing between light spots and for identifying them.

An inventive method for distinguishing between reflectors arranged on the roadside and vehicle lights and for identifying said reflectors and vehicle lights for use in an automatic light control system in a vehicle comprises a camera sensor oriented towards the surroundings of the vehicle. The camera sensor records a sequence of images of the surroundings of the vehicle. Light spots are found and subjected to temporal tracking within the sequence of images. Afterwards, for each light spot, a decision is made whether the light source of the light spot is a reflector arranged on the roadside or a vehicle light. This later identification of a light spot may be particularly based on the maximum intensity of the light spot and/or on the lifetime of the light spot.

A statistical map for the entire camera image is determined from the position of the light spots found. The statistical map is derived from the type and the positions of the light spots that have already been found and identified. The statistical map comprises regions/sectors that are predominantly occupied by reflectors and regions/sectors that are predominantly occupied by vehicles driving ahead or by oncoming vehicles.

All light sources that are subsequently found within the regions occupied by reflectors are identified as potential reflectors, wherein "potential reflector" means that such a light spot is more likely to be identified as a reflector than a light spot that was not found within a region occupied by reflectors. If no further criterion for distinguishing were present or taken into consideration, a light spot found within a region occupied by reflectors would be identified as a reflector. Accordingly, all light sources within the regions occupied by vehicle lights are identified as potential vehicle lights.

According to an embodiment, light spots that are arranged, in the image, in line with further light spots are identified as potential reflectors.

In a further exemplary embodiment, light spots whose spatial arrangement corresponds to a periodic arrangement of light sources in the real space are identified as potential reflectors.

In an advantageous realisation of the invention, a statistical map in world coordinates is created by taking into consideration the static or dynamic camera fitting position. The statistical map in world coordinates comprises regions that are predominantly occupied by reflectors and regions that are predominantly occupied by vehicles driving ahead or by oncoming vehicles.

When making a decision whether the light source of the light spot is a vehicle light or a reflector, the direction and the length of a displacement vector for the tracked light spot may be taken into consideration, too. The displacement vector indicates by what amount (length) and in what direction a light spot has displaced from one image to the subsequent image.

When determining the displacement vectors, the speed of one's own vehicle may be taken into consideration. If the displacement vectors are scaled correspondingly, the result will be a speed-invariant distribution of the displacement vectors. Reflectors can be identified by the displacement vectors of the corresponding light spots essentially corresponding to the motion of the vehicle. In the speed-invariant representation, displacement vectors of reflectors are theoretically zero.

According to an embodiment, the point in time of the decision whether the light source is a vehicle or a reflector is delayed or accelerated in dependence on the position where the light spot is found and on the intensity of the light spot.

Varying weights may be assigned to the influence of the statistical map and to the influence of further criteria, such as the current intensity of a light spot, the in-line arrangement and/or the periodic arrangement of light spots, on distinguishing and identifying. For example, if there is only an indication of the presence of a vehicle light, a quick decision should be made so that the automatic light control system dips the headlights in order not to dazzle other drivers. However, if the indications of the presence of a reflector predominate, the decision may be delayed until the basis for the decision is more reliable.

Furthermore, the map consisting of continuous or discrete regions may be provided with a forgetting factor in order to take changes of the course of the road and/or changes of the buildings on the roadside into consideration.

In an advantageous realisation, the steering angle and/or the yaw angle are/is known, for example from sensor data, and the curvature of the map is adapted to the course of the road.

A further development of the invention provides a sensor-based lane detection system that supplies information about the lane lying ahead. The lane detection may be based on data of a radar sensor, of a lidar sensor, or of a camera sensor, for example. On the basis of this information about the roadway curvature lying ahead, the position of the regions in which potential reflectors can be found is adapted on the statistical map.

As an alternative, the course of the lane may be determined by means of a GPS Receiver and a digital road map that are integrated in a navigation device, for example. The information from the navigation device may be also combined with the information supplied by the sensor-based lane detection system.

Furthermore, the statistical map may be adapted to the roadway width determined by the lane detection system and to the determined current driving behaviour, wherein the current driving behaviour comprises a change of lane or changes of the yaw angle.

Furthermore, the invention includes a device for distinguishing between and for identifying reflectors arranged on the roadside and vehicle lights in the surroundings of a vehicle. The device comprises a camera sensor and an evaluation unit. The evaluation unit evaluates the image data acquired by the camera sensor and applies, for this purpose, one of the aforementioned methods.

The advantage of the invention consists in the fact that it provides increased reliability of distinguishing between reflectors and vehicle lights, whereby malfunctions of the automatic light control system are prevented and ride comfort and safety are improved. The use of a statistical map reduces the period of time that passes by until a distinction can be made.

BRIEF DESCRIPTION OF THE DRAWINGS

In the following, the invention will be explained in greater detail on the basis of exemplary embodiments and drawings.

DETAILED DESCRIPTION

Figure 1:
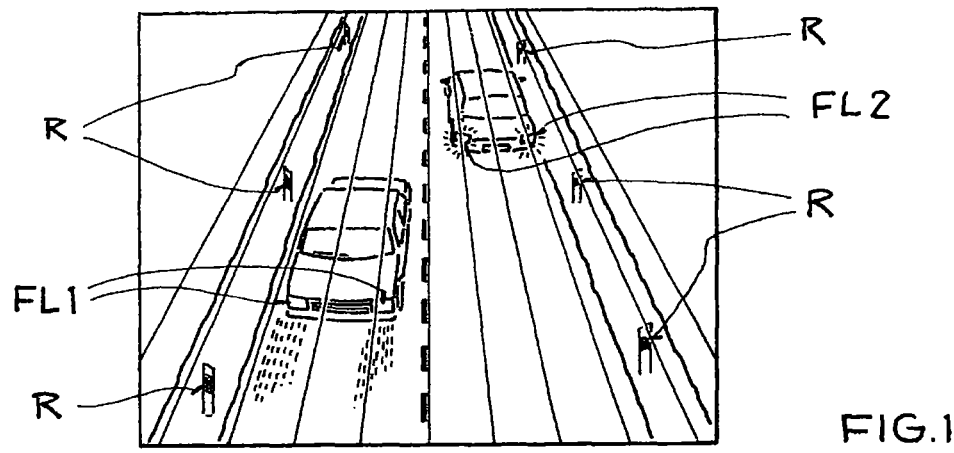
FIG. 1 shows a sectored camera image for explaining the generation of a statistical map.

FIG. 1 is a schematic representation of an image recorded by the camera sensor. The image shows a roadway, an oncoming vehicle and a vehicle driving ahead (FL1, FL2), and reflectors (R) that are arranged on the roadside. In the dark, the vehicles and the road demarcation posts can only be seen as light spots. The image is sectored. In the example of FIG. 1, the sectors are defined by strips of the same width (e.g. a width of 1 m) that extend in the direction of traffic. This way of sectoring is particularly suitable for straight roadway portions. The camera sensor records a sequence of images. Light spots are found and subjected to temporal tracking within the sequence of images. Afterwards, for each light spot, a decision is made whether the light source of the light spot is a reflector (R) arranged on the roadside or a vehicle light (FL1, FL2). This distinction may be made on the basis of courses of intensity, of motion patterns, or of other suitable parameters.

A frequency distribution is set up. It shows in which sector a reflector (R) or a vehicle light (FL1, FL2) was identified at what frequency. The statistical map for the entire camera image is derived from this frequency distribution, wherein said entire camera image is made up of the sectors. The statistical map shows for each sector how frequently reflectors (R) have been identified there and how frequently lights of vehicles driving ahead (FL2) or of oncoming vehicles (FL1) have been identified there.

A statistical map for the situation of FIG. 1 would show neutral sectors (extreme left, extreme right), sectors with a large number of reflectors (R) (left and right roadside sectors), and sectors with a large number of vehicle lights (FL1, FL2) (sectors on the roadway).

If the camera sensor records an image with a new light spot and if the light spot is found by an evaluation unit, it will be determined from the statistical map how frequently reflectors (R) and vehicle lights (FL1, FL2) have appeared in the sector in which the light spot was found. If the number of reflectors (R) that have appeared in that sector is larger than the number of vehicle lights (FL1, FL2) that have appeared in that sector, the light spot will be identified as a potential reflector (R), and vice versa.

If the number of reflectors (R) that have appeared in that sector and the number of vehicle lights (FL1, FL2) that have appeared in that sector are the same or are similar to each other, identification will be delayed until further features of the light spot allow a reliable identification. Further features used for identification may be courses of intensity as well as the geometrical arrangement or the displacement vectors of light spots.

As shown in FIG. 1, reflectors (R) are often arranged in line with further reflectors (R). The spatial arrangement of reflectors (R) often corresponds to a periodic arrangement of reflectors (R) with equal distances between two reflectors (R) in the real space.

The knowledge of the speed of one's own vehicle makes an analysis of the displacement vectors of light spots easier. In this case it is known which image spot in motionless surroundings is displaced by what amount. Thus it is possible to transform a determined displacement vector into the system of the travelling vehicle. The displacement vectors transformed in such a manner are also called "speed-invariant displacement vectors". Among the speed-invariant displacement vectors there are vectors pointing in the direction of traffic, vectors pointing in the direction that is opposite the (one's own) direction of traffic, and vectors that represent no motion. These vectors correspond to vehicles driving ahead (FL2), oncoming vehicles (FL1), and stationary reflectors (R).

Figure 2:
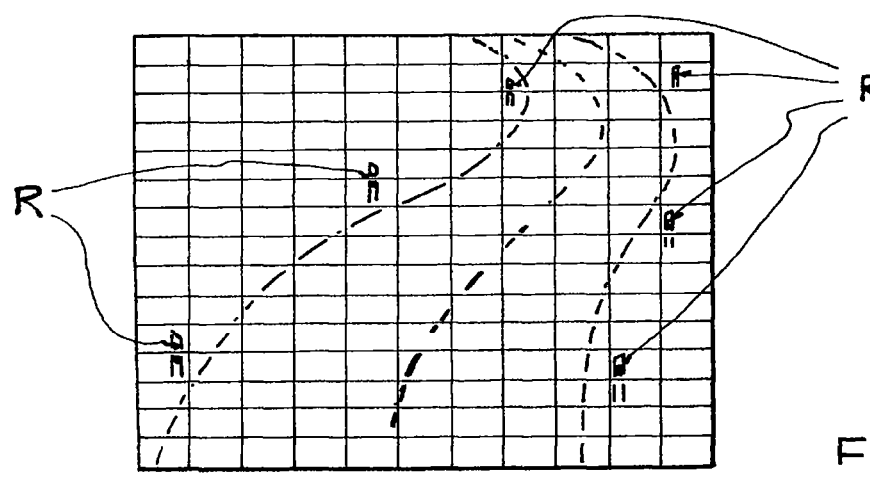
FIG. 2 shows a sectored image with smaller rectangular sectors for a winding course of a road.

In FIG. 2 the camera image is sectored in such a manner that it forms a grid. The sectors are rectangular. Compared to FIG. 1, this way of sectoring is finer and thus results in a larger number of sectors, and its advantage consists in the fact that a corresponding statistical map can take a winding course of a road into consideration. The statistical map is generated in the way described above and corresponds to a collection of trajectories of identified light spots with the resolution of the grid.

Figure 3:
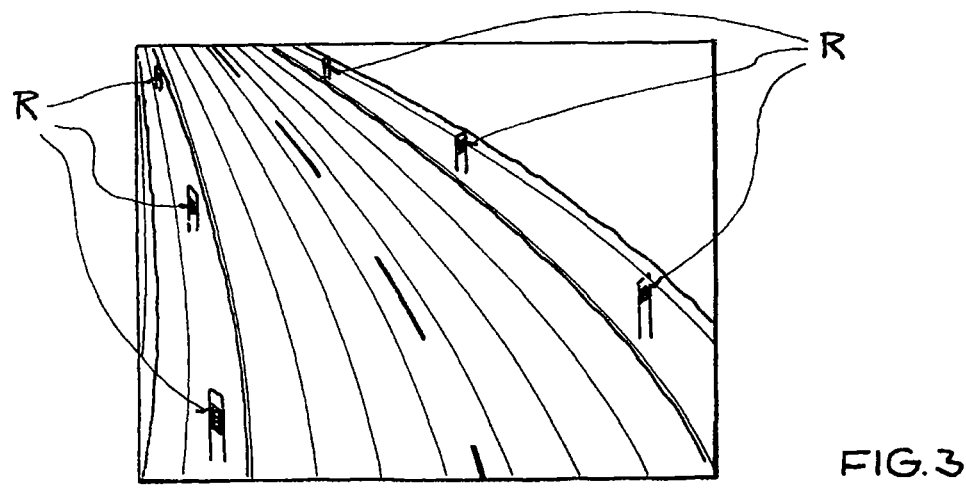
FIG. 3 shows the adaptation of map sectors to a course of a road determined by a lane detection system.

FIG. 3 shows an exemplary adaptation of the sectors to the course of the roadway. The course of the roadway is determined by a radar-based, a lidar-based or a camera-based lane detection system. On the basis of the information about the roadway curvature lying ahead supplied by the lane detection system, the position of the sectors in which potential reflectors (R) or vehicle lights (FL1, FL2) can be found is adapted on the statistical map. The representation in FIG. 3 shows a left-hand bend. Correspondingly, the sectors that correspond to parallel strips of a predetermined width are curved by the same curve radius. All reflectors (R) on the left-hand side and all reflectors (R) on the right-hand side can be found in one sector each. If the sector width were different, reflectors (R) could also be found in two or three sectors each. By contrast, vehicle lights (FL1, FL2) will be found more frequently in the sectors that are arranged between the sectors occupied by reflectors (R).

The invention claimed is:

1. A method for distinguishing between reflectors (R) arranged on the roadside and vehicle lights (FL1, FL2) and identifying said reflectors (R) and vehicle lights (FL1, FL2) for use in a vehicle with a camera sensor oriented towards the surroundings of the vehicle, comprising:
    recording a sequence of images of the surroundings of the vehicle;
    finding and temporally tracking light spots within the sequence of images;
    deciding, for each light spot, whether the light source of the light spot is a vehicle light (FL1, FL2) or a reflector (R);
    determining a statistical map for the entire camera image from the position of the light spots found, by defining reflector regions within the camera image that are predominantly occupied by reflectors (R) and defining vehicle regions within the camera image that are predominantly occupied by vehicles driving ahead (FL2) or by oncoming vehicles (FL1), the reflector regions being separate from the vehicle regions;
    identifying all light sources that are found within the reflector regions as potential reflectors (R); and
    identifying all light sources within the vehicle regions as potential vehicle lights (FL1, FL2).

2. The method according to claim 1, wherein light spots that are arranged, in the image, in line with further light spots are identified as potential reflectors (R).

3. The method according to claim 1, wherein light spots whose spatial arrangement corresponds to a periodic arrangement of light sources in the real space are identified as potential reflectors (R).

4. The method according to claim 1, wherein a statistical map in world coordinates is created by taking into consideration the camera fitting position, said statistical map in world coordinates comprising regions that are predominantly occupied by reflectors (R) and regions that are predominantly occupied by vehicles driving ahead or by oncoming vehicles (FL1, FL2).

5. The method according to claim 1, wherein deciding, for each light spot, whether the light source of the light spot is a vehicle light (FL1, FL2) or a reflector (R) further comprises considering the direction and the length of a displacement vector for the tracked light spot.

6. The method according to claim 1, wherein the point in time of the decision whether the light source is a vehicle (FL1, FL2) or a reflector (R) is delayed or accelerated in dependence on the position where the light spot is found and on the intensity of the light spot.

7. The method according to claim 1, wherein the steering angle and/or the yaw angle are/is known and the curvature of the map is adapted to the course of the road.

8. The method according to claim 1, wherein a sensor-based lane detection system is provided that supplies information about the lane lying ahead so that the position of the map regions in which potential reflectors (R) can be found is adapted according to the information about the roadway curvature lying ahead.

9. The method according to claim 8, wherein the statistical map is adapted to the roadway width determined by the lane detection system.

10. The method according to claim 8, wherein the statistical map is adapted to the current driving behaviour determined by the lane detection system.

11. A device for distinguishing between and for identifying reflectors (R) arranged on the roadside and vehicle lights (FL1, FL2) in the surroundings of a vehicle, said device comprising a camera sensor and an evaluation unit, wherein the evaluation unit evaluates the image data acquired by the camera sensor and applies, for this purpose, a method according to claim 1.

12. The method according to claim 1, wherein identification of all light sources that are found outside the vehicle regions and reflector regions is delayed until further features of the light sources allow identification to be performed.

* * * * *

UNITED STATES PATENT AND TRADEMARK OFFICE
CERTIFICATE OF CORRECTION

PATENT NO. : 8,587,456 B2  
APPLICATION NO. : 12/739760  
DATED : November 19, 2013  
INVENTOR(S) : Walter et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 469 days.

Signed and Sealed this
Twenty-second Day of September, 2015

Michelle K. Lee
*Director of the United States Patent and Trademark Office*